US007036117B2

(12) United States Patent
Garvey

(10) Patent No.: US 7,036,117 B2
(45) Date of Patent: Apr. 25, 2006

(54) OPTIMAL CODE GENERATION FOR STRUCTURED ASSEMBLY LANGUAGE EXPRESSIONS

(75) Inventor: Joseph Franklin Garvey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 09/939,378

(22) Filed: Aug. 24, 2001

(65) Prior Publication Data

US 2003/0115577 A1 Jun. 19, 2003

(51) Int. Cl.
G06F 9/45 (2006.01)
(52) U.S. Cl. .................................... 717/159
(58) Field of Classification Search ............. 717/128, 717/143, 144, 159; 712/207, 234; 710/240
See application file for complete search history.

(56) References Cited

U.S. PATENT DOCUMENTS

| | | | | |
|---|---|---|---|---|
| 5,598,560 | A | * | 1/1997 | Benson ..................... 717/159 |
| 5,774,726 | A | * | 6/1998 | Ahmed ..................... 717/143 |
| 6,012,836 | A | * | 1/2000 | Mangelsdorf ................ 703/6 |
| 6,061,514 | A | | 5/2000 | Kuno |

OTHER PUBLICATIONS

Leeper et al., "Structured Assembly Language in VAX-11 MACRO", Feb. 1986, Proceedings of the 17th SIGCSE technical symposium on Computer Science education, vol. 18,m issue 1, pp. 53-60.*

Curzon, Paul, "A Verified Compiler for a Structured Assembly Language", 1992, International Workshop on Higher Order Logic Theorem Proving and Its Applications, pp. 253-262.*

Silver et al., "Schemata for Teaching Structured Assembly Language Programming", 1983, Proceedings on the 14$^{th}$ SIGCSE technical symposium on Computer scienc education, ACM Press, pp. 128-132.*

Analysis of Complex Assembler Programs, IBM Technical Disclosure Bulletin, Nov. 1991, pp. 98-100.

Functional Binary Assembler, IBM Technical Disclosure Bulletin, Oct. 1991, pp. 259-261.

Assembler Macro Implementation, IBM Technical Disclosure Bulletin, May 1994, pp. 19-28.

General Purpose Assembler for Microprocessors, IBM Technical Disclosure Bulletin, Jan. 1979, pp. 3356-3357.

Process to Convert Assembler Language Programs to Decision Tables, IBM Technical Disclosure Bulletin, Dec. 1977, pp. 2654-2658.

Fast Assembler using APL, IBM Technical Disclosure Bulletin, Jun. 1977, pp. 368-372.

* cited by examiner

*Primary Examiner*—Kakali Chaki
*Assistant Examiner*—Tuan A. Vu
(74) *Attorney, Agent, or Firm*—Joscelyn G. Cockburn; Dillon & Yudell LLP

(57) ABSTRACT

An optimal code generator for generating structured assembly language expressions is disclosed. Because of the equivalence between unit structured assembly language expressions and the code implementing them, it is possible to represent complex structured assembly language expressions as a vector of unit structured assembly language expressions. A set of rules for systematic manipulation is utilized to allow logical operations on the vector representation of structured assembly language expressions to result in optimal code. Using the equivalence between the code and unit structured assembly language expressions allows the vector representation of a structured assembly language expression to be translated directly into code.

8 Claims, 4 Drawing Sheets

| COMPLEMENTARY CONDITION CODES | | COMPLEMENTARY CONDITION CODES | |
|---|---|---|---|
| <a> | <ba> | <as> | <bes> |
| <ae> | <b> | <aes> | <bs> |
| <g> | <le> | <gs> | <les> |
| <ge> | <l> | <ges> | <ls> |
| <e> | <ne> | <es> | <nes> |
| <z> | <nz> | <c> | <nc> |
| <p> | <np> | <o> | <no> |
| <tz> | <tnz> | | |

FIG. 3

| OPCODE | CONDITION CODE |
|---|---|
| cmps | <as> <aes> <bs> <bes> <gs> <ges> <ls> <les> <es> <nes> |
| cmp | <a> <ae> <b> <be> <g> <ge> <l> <le> <e> <ne> |
| tst | <tnz> <tz> |
| n/a | <z> <nz> <o> <no> <c> <nc> <p> <np> |

FIG. 4

| MNEMONIC | DESCRIPTION | MNEMONIC | DESCRIPTION |
|---|---|---|---|
| <a> | ABOVE | <as> | ABOVE, SIGNED |
| <ae> | ABOVE OR EQUAL | <aes> | ABOVE OR EQUAL, SIGNED |
| <b> | BELOW | <bs> | BELOW, SIGNED |
| <be> | BELOW OR EQUAL | <bes> | BELOW OR EQUAL, SIGNED |
| <g> | GREATER THAN | <gs> | GREATER THAN, SIGNED |
| <ge> | GREATER THAN OR EQUAL | <ges> | GREATER THAN OR EQUAL, SIGNED |
| <l> | LESS THAN | <ls> | LESS THAN, SIGNED |
| <le> | LESS THAN OR EQUAL | <les> | LESS THAN OR EQUAL, SIGNED |
| <e> | EQUAL | <es> | EQUAL, SIGNED |
| <ne> | NOT EQUAL | <nes> | NOT EQUAL, SIGNED |
| <z> | ZERO FLAG SET | <nz> | ZERO FLAG IS CLEAR |
| <c> | CARRY FLAG SET | <nc> | CARRY FLAG IS CLEAR |
| <o> | OVERFLOW FLAG SET | <no> | OVERFLOW FLAG IS CLEAR |
| <p> | SIGN FLAG IS POSITIVE OR ZERO | <n> | SIGN FLAG IS NEGATIVE |
| <tz> | TST AND ZERO FLAG SET | <tnz> | TST AND ZERO FLAG NOT SET |

FIG. 5

OPTIMAL CODE GENERATION FOR STRUCTURED ASSEMBLY LANGUAGE EXPRESSIONS

BACKGROUND OF THE INVENTION

1. Technical Field

The present invention relates to assembly language programming in general, and in particular to structured assembly language programming. Still more particularly, the present invention relates to an optimal code generator for generating structured assembly language expressions utilized in structured assembly language programming.

2. Description of the Prior Art

Structured assembly language programming is an improvement to the basic syntax of conventional assembly language programming. In essence, structured assembly language programming allows the usage of structured programming constructs, such as if-elseif-else-endif, while-endwhile, repeat-until, etc., similar to those generally found in high-level programming languages such as Pascal or C. At the core of each structured assembly language construct is a structured assembly language expression. Examples of structured assembly language expressions in mnemonic form includes

```
r0 <eq> r1
<z>
(w0 <le> #0xFF) && !(w2 <ne> w4)
```

Each structured assembly language expression results in code being generated, and the generated code should be optimal, which means:

1. minimum number of instructions should be generated;
2. structured assembly language expression should be evaluated in reading order;
3. structured assembly language expression operators should follow standard precedence rules, such as logical AND evaluated before logical OR;
4. execution should exit an expression as soon as the expression is known to be true or false; and
5. the generated code for an expression should be located where the expression appears within the entire program, otherwise, it will be difficult to use labels with structured assembly language constructs.

Historically, logical functions and arithmetic functions are combined and processed by a stack machine based algorithm. The usage of a stack machine algorithm in a compiler for expression evaluation is very flexible. However, the stack machine implementation does not necessarily result in optimal code, and the fact that the stack machine implementation is non-optimal makes it unsuitable for evaluating/generating code for structured assembly language expressions. Another mechanism utilized in a compiler for expression evaluation is through repeated use of the DeMorgan's Theorem (i.e., !(A && B)=!A ||!B), which can be used to separate a structured assembly language expression into a series of logical AND statements. However, the DeMorgan's Theorem implementation is also non-optimal. Consequently, it would be desirable to provide an optimal code generator for generating structured assembly language expressions utilized in structured assembly language programming.

SUMMARY OF THE INVENTION

In accordance with a preferred embodiment of the present invention, an optimal code generator for generating structured assembly language expressions utilized in structured assembly language programming includes a program code means for recognizing unit structured assembly language expressions and for combining structured assembly language expressions into higher order structured assembly language expressions. Structured assembly language expressions are constructed by logically combining unit structured assembly language expressions. Because of the equivalence between unit structured assembly language expressions in mnemonic form and the code implementing those unit structured assembly language expressions, it is possible to represent complex structured assembly language expressions as a vector of unit structured assembly language expressions. A set of rules is utilized to perform logical operations on the vector representation of a structured assembly language expression without introducing changes that result in non-optimal code. Using the equivalence between the code and unit structured assembly language expressions allows the vector representation of a structured assembly language expression to be translated directly into assembly code.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a table that indicates a set of typical condition codes and their respective complementary condition codes;

FIG. 4 is a table of condition codes illustrating how to overload a condition code to select a comparison opcode in a unit structured assembly language expression;

FIG. 5 is a table of condition code mnemonics and their respective descriptions.

DETAILED DESCRIPTION OF A PREFERRED EMBODIMENT

Figure 1:
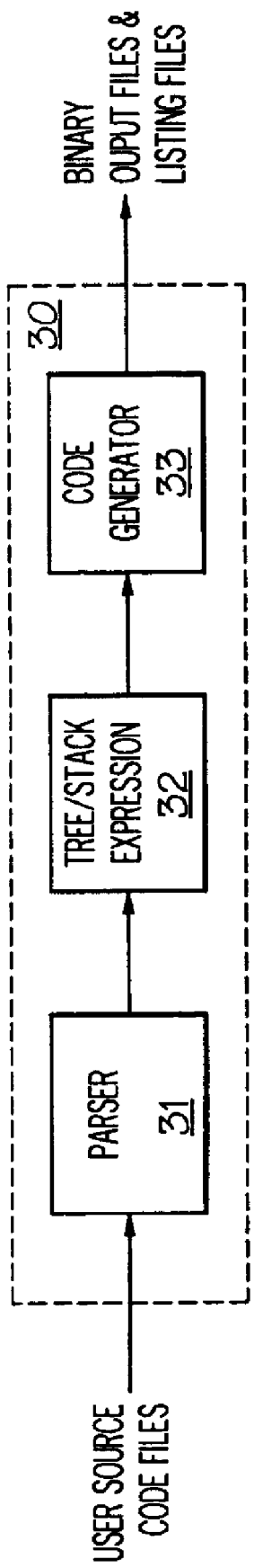
FIG. 1 is a block diagram of an assembler according to the prior art.

Referring now to the drawings and, in particular, to FIG. 1, there is depicted a block diagram of an assembler according to the prior art. As shown, an assembler 30 includes an assembler parser 31, an assembler expression tree/stack 32, and an assembler code generator 33. After processing user source code files, assembler 10 generates binary output files and listing files.

Figure 2:
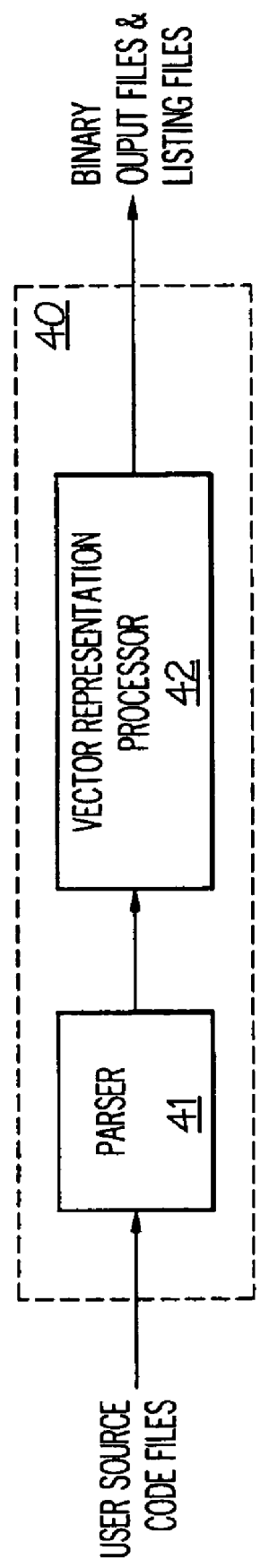
FIG. 2 is a block diagram of an assembler in accordance with a preferred embodiment of the present invention.

With reference now to FIG. 2, there is depicted a block diagram of an assembler in accordance with a preferred embodiment of the present invention. As shown, an assembler 40 includes an assembler parser 41 and a vector-representation assembler code generator 42. Similar to assembler 30 from FIG. 1, assembler 40 generates output files based on user source files. Compared with the prior art assembler 30 shown in FIG. 1, the present invention replaces compiler-like assembler expression tree/stack 32 and assembler code generator 33 with vector-representation assembler code generator 42. A vector-representation assembler code generator 42 provides assembler 40 with the ability to generate optimal code for structured assembly language expressions. A vector-representation assembler code generator 42 preferably generates structured assembly language code in accordance with four rules, namely, Rule #1, Rule #2, Rule #3, and Rule #4, as will be explained further in detail.

The simplest structured assembly language expression's mnemonics has the form:

---
arg1a <cc> arg1b
--- where
- arg1a, arg1b are valid arguments for the comparison opcodes available; and
- cc is a condition code for a branch opcode for selecting a comparison opcode.

Rule #1 states that there is an equivalence between the simplest form of a structured assembly language expression's mnemonics and its generated code. The generated code for implementing the above-mentioned structured assembly language expression has the following form:

---
|  | cmp arg1,arg2 |
|  | b!cc next_or |
| next_and: | ;if |
| next_or: | ;else |
---

As shown, the generated code includes the following four items:
1. a selected comparison opcode (typically cmp or tst opcodes) for a given condition code;
2. a branch on the complementary condition code;
3. a branch location or label, such as next_and, for execution to proceed at if the expression is true; and
4. a branch location or label, such as next_or, for execution to proceed at if the expression is false.

It should be noted that:
1. there is always a complementary condition code. For example, the complimentary condition code for "less than" is "greater than or equal to." An example of complementary condition code pairs is shown in FIG. 3; and
2. the next_and label is usually located immediately after the expression such that the execution can continue immediately after the expression when the expression is true, and the last branch of the expression is not taken.

The above-mentioned structured assembly language expression having two arguments is referred to as a binary structured assembly language expression. In contrast, a structured assembly language expression having only a condition code is called a unary structured assembly language expression.

A unary structured assembly language expression's mnemonics has the form:

---
<cc>
--- where
  cc is a condition code for a branch opcode.

The code generated for a unary structured assembly language expression is the same as the code generated for a binary structured assembly language expression, except the comparison opcode is not generated.

Both binary and unary structured assembly language expressions are the smallest possible structured assembly language expressions, and can be referred to as unit structured assembly language expressions. A unit structured assembly language expression can preferably be represented by a tuple, as follows:
  <condition code,args,branchto>
  where
  condition code of a tuple is overloaded to indicate both the comparison operator and the branch condition;
  args, if they exist, are intended as arguments for the comparison operator; and
  branchto has three possible values, namely, a next_and label, a next_or label, or an end of the expression.
It should be noted that:
1. an example mapping of condition codes with comparison opcodes is depicted in FIG. 4, and the description for the mnemonics of the condition code depicted in FIG. 3 is outlined in FIG. 5; and
2. the actual addresses of the next_and label and the next_or label do not belong to a tuple. They belong to the structured assembly language expression as a whole because the entire structured assembly language expression, and not an individual tuple, is either true or false.

Thus, a tuple contains all the information necessary to generate assembly code for a structured assembly language expression, except for the final addresses of the next_and and next_or labels. The final addresses for the next_and and next_or labels are determined by the structured assembly language construct that the expression is in (for example, if-else-endif, while-endwhile, repeat-until).

Multiple unit structured assembly language expressions are referred to as a compound structured assembly language expression.

Rule #2 can be used to perform a logical AND between two structured assembly language expressions, i.e., SA_Expr1 && SA_Expr2, to form one structured assembly language expression, by:
1. any "branchto=next_and" for expression 1 is set to branch to the end of expression 1; and
2. form a vector by concatenating the tuples from each expression in the same order as a parser, such as parser 41 in FIG. 2, encountered them.

For example, in order to assemble (arg1a <cc1>arg1b) && (arg2a <cc2>arg2b), Rule #1 is initially used to convert the structured assembly language expression's mnemonics to tuples, as follows:

---
<cc1,args1,branchto=next_or>
 && <cc2,args2,branchto=next_or>
---

Rule #2 is then used to convert the logical AND of tuples to a single compound structured assembly language expression, which is a vector of tuples as follows:

```
<cc1,args1,branchto=next_or>
<cc2,args2,branchto=next_or>
```

Rule #1 is used again to allow conversion of the vector of tuples to the following code:

```
            cmp arg1a,arg1b
            b!cc1 next_or
            cmp arg2a,arg2b
            b!cc2 next_or
next_and:   ;if
next_or:    ;else
```

In a similar fashion, Rule #3 can be used to perform a logical OR between two structured assembly expressions, i.e., SA_Expr1||SA_Expr2, to form one structured assembly language expression, by:
1. any "branchto=next_or" for expression 1, except for the last tuple of expression 1, is set to branch to the end of expression 1;
2. the condition code for the last tuple of expression 1 is complemented;
3. the branch label for the last tuple of expression 1 is complemented (i.e., next_or becomes next_and, next_and becomes next_or, otherwise, no change); and
4. form a vector by concatenating the tuples from each expression in the same order as a parser, such as parser 41 in FIG. 2, encountered them.

For example, in order to assemble (arg3a <cc3>arg3b)|| (arg4a <cc4>arg4b), Rule #1 is initially used to convert the mnemonics to tuples, as follows:

```
<cc3,args3,branchto=next_or>
|| <cc4,args4,branchto=next_or>
```

Rule #3 is then used to convert the logical OR of tuples to a single compound structured assembly expression, which is a vector of tuples as follows:

```
<!cc3,args3,branchto=next_and>
<cc4,args4,branchto=next_or>
```

Rule #1 is used again to allow conversion of the vector of tuples to the following code:

```
            cmp arg3a,arg3b
            bcc3 next_and
            cmp arg4a,arg4b
            b!cc4 next_or
next_and:   ;if
next_or:    ;else
```

To extend this example a step further, consider logically ORing together the expressions from the two previous examples, that is:

```
( (arg1a <cc1> arg1b) && (arg2a <cc2> arg2b) )
  || ( (arg3a <cc3> arg3b) || (arg4a <cc4> arg4b) )
```

In tuple notation, the above expression becomes the vector of tuples:

```
<cc1,args1,branchto=end_of_tuple2>
<!cc2,args2,branchto=next_and>
<!cc3,args3,branchto=next_and>
<cc4,args4,branchto=next_or>
```

By using Rule #1, the code for the above tuple is as follows:

```
                 cmp arg1a,arg1b
                 b!cc1 end_of_tuple2
                 cmp arg2a,arg2b
                 bcc2 next_and
end_of_tuple2:
                 cmp arg3a,arg3b
                 bcc3 next_and
                 cmp arg4a,arg4b
                 b!cc4 next_or
next_and:        ;if
next_or:         ;else
```

Rule #4 can be used to logically negate a structured assembly language expression, i.e., !SA_Expr, to form a structured assembly language expression, by:
1. the branch label for all tuples in expression 1, except for the last tuple is complemented (i.e., next_or becomes next_and, next_and become next_or, otherwise, no change); and
2. the condition code for the last tuple of the expression is inverted.

For example, in order to assemble the negated version of the previous structured assembly language expression, that is:

```
!( ((arg1a <cc1> arg1b) && (arg2a <cc2> arg2b))
   || ((arg3a <cc3> arg3b) || (arg4a <cc4> arg4b)) )
```

The vector of tuples for the previous example and Rule #4 are used to yield a vector of tuples, as follows:

```
<cc1,args1,branchto = end_of_tuple2>
<!cc2,args2,branchto = next_or>
<!cc3,args3,branchto = next_or>
<!cc4,args4,branchto = next_or>
```

Rule #1 is then used to allow conversion of the vector of tuples to the following code:

```
cmp arg1a,arg1b
b!cc1 end_of_tuple2
cmp arg2a,arg2b
bcc2 next_or
```

-continued

```
end_of_tuple2:
                        cmp  arg3a,arg3b
                        bcc3 next_or
                        cmp  arg4a,arg4b
                        bcc4 next_or
    next_and:           ;if
    next_or:            ;else
```

The vector of tuples is a unique representation of a structured assembly language expression, and works with some very unique rules for mechanical manipulation of vectors of tuples to generate optimal code for all structured assembly language expressions. The four rules of the present invention are not mathematically derived (i.e., cannot be designed by a logic circuit designer). The rules are trivial to implement given the representation of a unit structured assembly language expression. The key to the rules is that the last tuple of a structured assembly language expression is special, and to avoid sub-optimal behavior can never take the form "bcc next_and," which would be a jump to the next instruction.

An assembler capable of processing structured assembly programming language may be executed in a variety of data processing systems under a number of different operating systems. The computer may be, for example, a personal computer, a midrange computer or a mainframe computer. In addition, the computer may be a stand-alone system or part of a network such as a local-area network (LAN) or a wide-area network (WAN).

Figure 6:
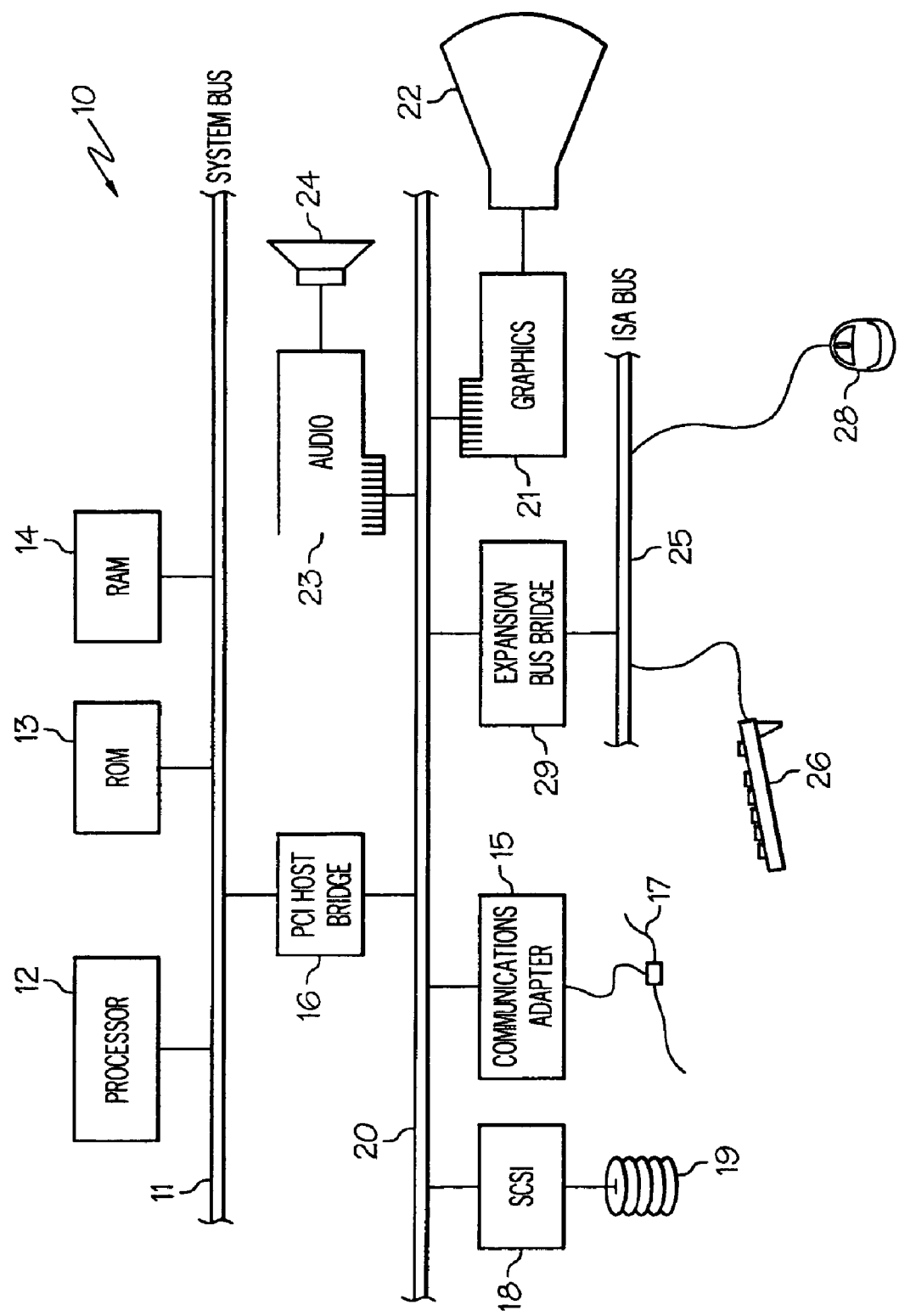
FIG. 6 is a block diagram of a computer system in which a preferred embodiment of the present invention can be implemented.

With reference now to FIG. 6, there is depicted a block diagram of a computer system 10 in which a preferred embodiment of the present invention can be implemented. As shown, a processor 12, a read-only memory (ROM) 13, and a random access memory (RAM) 14 are connected to a system bus 11. Processor 12, ROM 13, and RAM 14 are also coupled to a peripheral component interconnect (PCI) bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14. In addition, an audio adapter 23 and a graphics adapter 21 may be attached to PCI bus 20. Graphics adapter 21 controls visual output through a video monitor 22 and audio adapter 20 controls audio output through a speaker 24. Also attached to PCI bus 20 is a communications adapter 15 and a small computer system interface (SCSI) 18. Communications adapter 15 connects computer system 10 to a local-area network (LAN) 17. SCSI 18 is utilized to control a high-speed SCSI disk drive 19. Expansion bus bridge 29, such as a PCI-to-ISA bus bridge, may be utilized for coupling an industry standard architecture (ISA) bus 25 to PCI bus 20. As shown, a keyboard 26 and a mouse 28 are attached to ISA bus 25 for performing certain basic I/O functions.

As has been described, the present invention provides an optimal code generator for generating structured assembly language expressions utilized in structured assembly language programming.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. An assembler for processing structured assembly language expressions utilized in structured assembly language programming, said assembler comprising:
    means for recognizing a structured assembly language expression's mnemonics containing elements arg1 cc arg2, wherein said cc is a condition code, wherein the form of said expression's mnemonics or the nature of one or more of said expression's elements selects a corresponding comparison opcode, wherein said arg1 and said arg2 are valid arguments for said selected comparison opcode;
    means for constructing a data structure referencing said arg1, said arg2, said cc, and a branch destination;
    means for generating a comparison opcode in response to elements of said data structure;
    means for generating a conditional branch based on said condition code in said data structure;
    means for generating a first branch location for execution to proceed as if said structured assembly language expression is true;
    means for generating a second branch location for execution to proceed as if said structured assembly language expression is false;
    means for generating a third branch location for execution to proceed to the end of said structured assembly language expression; and
    means for indicating said branch destination in said data structure is a branch to said first, said second, or said third branch locations.

2. The assembler of claim 1, wherein said assembler further includes means for recognizing a structured assembly language expression's mnemonics having a form cc, wherein said cc is a condition code.

3. The assembler of claim 1, wherein said assemmer further includes a means for generating a data structure referencing at least no arguments, cc, and a branch destination in response to said condition code.

4. The assembler of claim 1, wherein said assembler further includes means for not generating a comparison opcode in response to said data structure.

5. The assembler of claim 1, wherein said assembler further includes a means for generating assembly language code by iterating over a vector of said structured assembly language data structures of various forms.

6. The assembler of claim 1, wherein said assembler further includes
    means for recognizing a structured assembly language expression's mnemonics resulting from a logical AND-ing of SA_Expr1 and SA_Expr2, wherein each of said SA_Expr1 and said SA_Expr2 is a unit or a compound structured assembly language expression;
    means for setting said branch in each data structure of said SA_Expr1 that is branching to said first branch location to branch to end of said SA_Expr1; and means for concatenating and preserving order of data structures in said SA_Expr1 and said SA_Expr2 into a single compound structured assembly language expression.

7. The assembler of claim 1, wherein said assembler further includes
   means for recognizing a structured assembly language expression's mnemonics requiring a logical ORing of SA_Expr3 and SA_Expr4, wherein each of said SA_Expr3 and said SA_Expr4 is a unit or a compound structured assembly language expression;
   means for changing a branch location in data structures of said SA_Expr3, except for a last data structure of said SA_Expr3, from said second branch location to end of said SA_Expr3;
   means for complementing said branch condition in said SA_Expr3's last data structure;
   means for changing said branch location in said last data structure of said SA_Expr3 from a branch to said first location to branch to said second location, or from a branch to said second location to branch to said first location; and
   means for concatenating and preserving order of data structures in said SA_Expr3 and said SA_Expr4 into a single compound structured assembly language expression.

8. The assembler of claim 1, wherein said assembler further includes
   means for recognizing said structured assembly language expression's mnemonics requiring from a logical negation of SA_Expr5, wherein said SA_Expr5 is a unit or compound structured assembly language expression;
   means for changing a branch location in data structures of said SA_Expr5, except for a last data structures of said SA_Expr5, from said first branch location to said second branch location, while changing said branch location in each of said SA_Expr5's data structures, except for said SA_Expr5's last data structure, from said second branch location to said first branch location; and
   means for complementing said branch condition in said SA_Expr5's last data structure.

* * * * *